United States Patent [19]

O'Rourke

[11] Patent Number: 5,174,243
[45] Date of Patent: Dec. 29, 1992

[54] CHEW TOY FOR DOGS

[75] Inventor: Anthony O'Rourke, Malibu, Calif.

[73] Assignee: Booda Products, Inc., Los Angeles, Calif.

[21] Appl. No.: 533,711

[22] Filed: Jun. 5, 1990

Related U.S. Application Data

[63] Continuation-in-part of Ser. No. 421,006, Oct. 13, 1989.

[51] Int. Cl.⁵ .............................................. A01K 15/00
[52] U.S. Cl. ................................... 119/29.5; 433/1; 132/323; D30/160
[58] Field of Search ............... 119/29, 29.5; D30/160, D30/199; 482/81, 82; 433/1; 132/323; 446/307, 491

[56] References Cited

U.S. PATENT DOCUMENTS

| | | | |
|---|---|---|---|
| 1,559,320 | 10/1925 | Hirsh | 132/323 |
| 3,476,086 | 11/1969 | Way | 119/29 |
| 3,830,202 | 8/1974 | Garrison | 119/29 |
| 4,133,296 | 1/1979 | Smith | 119/29 |
| 4,157,827 | 6/1979 | Winston et al. | 482/82 |
| 4,375,886 | 3/1983 | Muys | 482/82 |
| 4,807,752 | 2/1989 | Chodorow | 132/323 |
| 4,924,811 | 5/1990 | Axelrod | 119/29 |
| 5,033,410 | 7/1991 | Sigurdsson | 119/29.5 |

FOREIGN PATENT DOCUMENTS

| | | | |
|---|---|---|---|
| 559793 | 7/1958 | Canada | 482/82 |
| 2083217 | 12/1971 | France | 119/29 |
| 1043017 | 9/1966 | United Kingdom | 482/82 |

OTHER PUBLICATIONS

Zenco Quality Products Catalog, item #687, 688, p. 16, Zenco Novelty Co., New York, NY, Feb. 1956.

Primary Examiner—Gene Mancene
Assistant Examiner—Todd E. Monahan
Attorney, Agent, or Firm—Lyon & Lyon

[57] ABSTRACT

A therapeutic chew toy particularly adapted for dogs includes a shaft portion formed of a length of a soft rope material and a pair of plastic end members secured to the ends of the shaft portion such that upon being chewed by an animal, the shaft portion provides teeth cleaning and gum massage and the plastic end members provide teeth and jaw development.

9 Claims, 1 Drawing Sheet

5,174,243

CHEW TOY FOR DOGS

This is a continuation in part of pending U.S. Design patent application, Ser. No. 421,006, filed Oct. 13, 1989 and entitled "Chew Toy for Dogs".

BACKGROUND OF THE INVENTION

The present invention relates to a therapeutic chew toy particularly adapted for use by dogs. Various configurations of chew toy for dogs are well known. An example of such a device is found in U.S. Pat. No. 3,871,334. Such devices not only occupy dogs and satisfy their desire to chew but can also be beneficial to the proper development of the dog's teeth and jaw. Recently applicant has developed a cotton-rope chew toy which, while satisfying the chewing urge and being more durable than conventional rawhide chew toys, provides both a flossing action on the dog's teeth to gently clean the teeth and massages the gums, thereby preventing tartar buildup and periodontal disease. The configuration of that toy is the subject of the aforesaid pending design application, Ser. No. 421,006. While the cotton-rope toy provides beneficial cleaning of the teeth and massaging of the gums, the soft nature of the product does not provide the same degree of jaw development as could be obtained from chewing on a harder object. The chew toy of the present invention retains all of the benefits of the new cotton-rope chew toy while providing improved teeth jaw development.

SUMMARY OF THE INVENTION

Briefly, the present invention comprises a therapeutic chew toy particularly adapted for dogs. The toy includes a shaft portion constructed of a soft flexible rope configuration for providing both a flossing action on the dog's teeth to gently clean the teeth and a massaging of the animal's gums; and a pair of hard plastic knuckles affixed to the ends of the shaft portion to secure the ends of the rope shaft while providing a safe hard chew surface for the animal to satisfy their chewing need while promoting teeth and jaw development.

It is the principal object of the present invention to provide an improved durable chew toy for dogs.

It is another object of the present invention to provide a durable chew toy for dogs which, while satisfying the canine chewing urge, promotes teeth and jaw development and provides a gentle cleaning of the teeth and massaging of the gums.

These and other objects and advantages of the present invention will become readily apparent from the following detailed description taken in conjunction with the accompanying drawings.

IN THE DRAWINGS

DESCRIPTION OF THE PREFERRED EMBODIMENT

Figure 1:
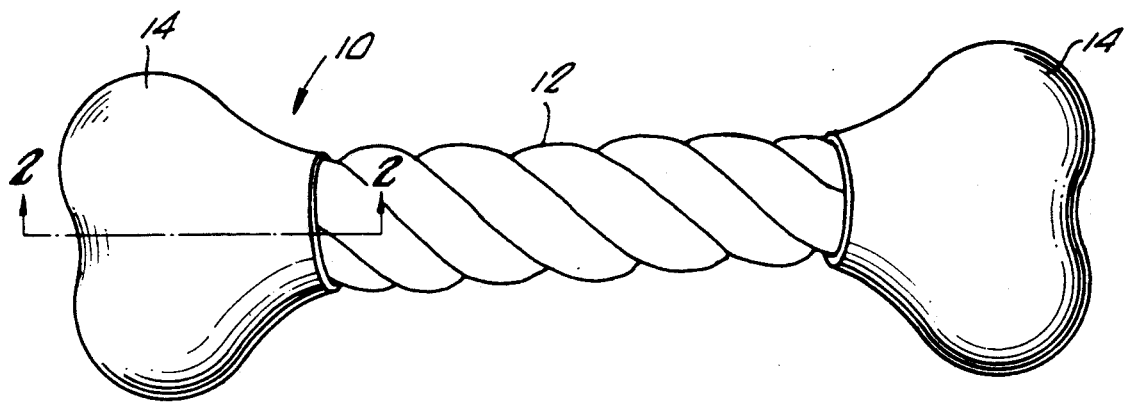
FIG. 1 is a perspective view of the chew toy of the present invention.
Figure 2:
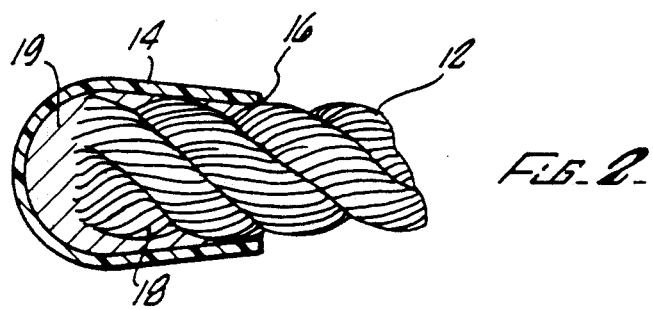
FIG. 2 is a sectional view taken along the lines 2—2 in FIG. 1.

Referring now in detail to the drawings, the chew toy 10 of the present invention comprises a shaft portion 12 and a pair of knuckles or end members 14. The shaft portion 12 is of a flexible rope configuration, preferably formed of cotton, so as to have a soft but rough texture such that when chewed by a dog, is effective in tartar removable and gum massage without being abrasive. While shaft 12 could be comprised of synthetic plastic materials, such as nylon, such materials would be less desirable due to their smooth exterior surface which would not be as effective in cleaning the teeth.

The knuckles or end members 14 are constructed of a durable plastic material and define recessed areas 16 therein which are adapted to receive the extended ends 18 of the shaft portion 12. A suitable non-toxic adhesive 19 is preferably employed within the recessed areas 16 to permanently secure the knuckles 14 to and about the ends 18 of the shaft portion of the toy and prevent unraveling of ends 18. Other mechanical connections could be employed to secure the knuckles 14 to the shaft if desired. End members 14 could be of any desired configuration, smooth or textured.

Figure 3:
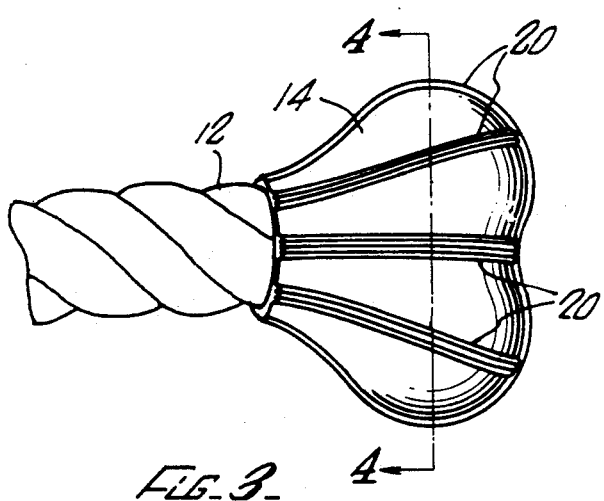
FIG. 3 is a partial perspective view of a second embodiment of one of the knuckles of the present invention illustrating zone texturing on the surface thereof.
Figure 4:
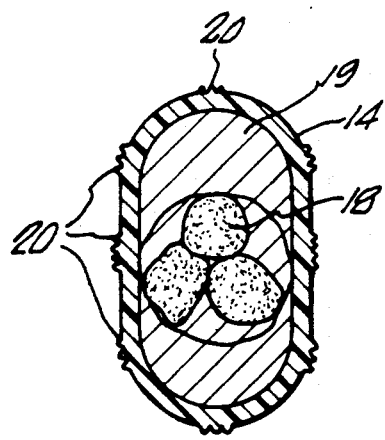
FIG. 4 is a sectional view taken along the line 4-4 in FIG. 3.

In a second embodiment of the knuckles, illustrated in FIGS. 3 and 4, portions 20 of the surface thereof are partially textured to define wear lines or other indicia so that the consumer would know to dispose of the toy when the textured zones 20 have been chewed away to prevent any possible ingesting of portions of the knuckles after periods of substantial use. Additionally, if desired, flavors or scents could be impregnated into the knuckles prior to molding.

Various other changes and modifications may be made in carrying out the present invention without departing from the spirit and scope thereof. Insofar as these changes and modifications are within the purview of the appended claims, they are to be considered as part of the present invention.

I hereby claim:

1. A chew toy for dogs comprising a substantially straight shaft portion formed of a relatively short length of soft material and defining extended ends, a pair of knuckle members constructed of a hard durable material, each of said members defining an outer gnawing surface and having a recess therein, said recesses having a closed end and an opened end, the ends of said shaft portions being disposed within said recesses proximate the closed ends thereof, and means for securing said ends of said shaft portions within said recesses whereby upon being chewed by a dog, said shaft portion provides teeth cleaning and gum massage and said knuckle members provides teeth and jaw development.

2. The toy of claim 1 wherein said outer gnawing surfaces on said knuckle members define raised textured surfaces extending over at least a portion thereof to define indicia of wear.

3. The toy of claim 1 or 2 wherein said knuckle members include a scent or flavoring impregnated therein.

4. The toy of claim 1 wherein said securing means comprises a nontoxic adhesive disposed within said recesses.

5. A chew toy for dogs comprising a substantially straight shaft portion formed of a relatively short length of rope material and defining extending ends, a pair of knuckle members constructed of a plastic material, each of said members defining an outer gnawing surface and having a recess therein, said recesses having a closed end and an opened end, the ends of said shaft portions being disposed within said recesses proximate the closed ends thereof, and a nontoxic adhesive disposed within said recesses for securing said extended ends of said shaft portion to said knuckle members whereby upon being chewed by a dog, said shaft portion provides teeth cleaning and gum massage and said knuckle members provide teeth and jaw development.

6. The toy of claim 5 wherein said outer gnawing surfaces on said knuckle members define raised textured surfaces extending over at least a portion thereof to define indicia of wear.

7. The toy of claim 5 or 6 wherein said knuckle members include a scent or flavoring impregnated therein.

8. A chew toy for dogs comprising a shaft portion formed of a length of cotton rope and a pair of end members constructed of a plastic material and having a scent or flavoring impregnated therein, said end members defining recesses therein, portions of said shaft portion extending into said recesses, and means for securing said portions within said recesses to secure said end members to said shaft portion whereby said shaft portion provides teeth cleaning and gum massage and said end portions provide teeth and jaw development.

9. A chew toy for dogs comprising a shaft portion formed of a length of cotton rope and a pair of end members constructed of a plastic material, said end members having a scent or flavoring impregnated therein and defining recesses therein, portions of said shaft portion extending into said recesses, means for securing said portions within said recesses to secure said end members to said shaft portion whereby said shaft portion provides teeth cleaning and gum massage and said end portions provide teeth and jaw development, and a raised textured surface extending over at least a portion of said end members to define indica of wear.

* * * * *